(12) United States Patent
Erdmann et al.

(10) Patent No.: US 9,306,431 B2
(45) Date of Patent: Apr. 5, 2016

(54) ENERGY HARVESTING DEVICE

(71) Applicant: KONINKLIJKE PHILIPS N.V., Eindhoven (NL)

(72) Inventors: Bozena Erdmann, Aachen (DE); Adrianus Johannes Josephus Van Der Horst, Vught (NL); Arthur Robert Van Es, Eindhoven (NL); Bas Willibrord De Wit, Dordrecht (NL); Armand Michel Marie Lelkens, Heerlen (NL); Ludovicus Marinus Gerardus Maria Tolhuizen, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/365,762

(22) PCT Filed: Dec. 14, 2012

(86) PCT No.: PCT/IB2012/057357
§ 371 (c)(1),
(2) Date: Jun. 16, 2014

(87) PCT Pub. No.: WO2013/088419
PCT Pub. Date: Jun. 20, 2013

(65) Prior Publication Data
US 2015/0084440 A1 Mar. 26, 2015

Related U.S. Application Data

(60) Provisional application No. 61/576,396, filed on Dec. 16, 2011.

(51) Int. Cl.
*H02K 7/18* (2006.01)
*H01H 9/16* (2006.01)
*H01H 5/06* (2006.01)

(52) U.S. Cl.
CPC ............. *H02K 7/1869* (2013.01); *H01H 9/168* (2013.01); *H02K 7/1892* (2013.01); *H01H 5/06* (2013.01); *H01H 2215/034* (2013.01); *H01H 2239/076* (2013.01); *H01H 2300/03* (2013.01); *Y02B 90/224* (2013.01); *Y04S 20/14* (2013.01)

(58) Field of Classification Search
CPC ... H01H 9/168; H01H 5/06; H01H 2239/076; H02K 7/1892; H02K 7/1869
USPC ........................................................ 290/1 R
See application file for complete search history.

(56) References Cited

U.S. PATENT DOCUMENTS

| 7,679,204 B2 * | 3/2010 | Chiu | 290/1 E |
|---|---|---|---|
| 8,169,091 B2 * | 5/2012 | Powers | 290/1 R |
| 8,362,628 B2 * | 1/2013 | Torino | 290/1 R |
| 2004/0090210 A1 * | 5/2004 | Becker et al. | 322/1 |
| 2010/0237631 A1 * | 9/2010 | Yu | 290/1 R |

FOREIGN PATENT DOCUMENTS

| DE | 10112072 A1 | 9/2001 |
|---|---|---|
| DE | 102010028623 A1 | 11/2011 |

* cited by examiner

*Primary Examiner* — Tulsidas C Patel
*Assistant Examiner* — Viet Nguyen
(74) *Attorney, Agent, or Firm* — Meenakshy Chakravorty

(57) ABSTRACT

The present invention relates to a very simple and robust wireless batteryless device (100) for harvesting energy. The actuation upon button pressure/release results in a rotation of a first member (1) around its central axis (11) leading to a move of an element (3), which is loosely fixed at the first member (1) from a pivot point (14), and a rotation around the central axis (11) of the second member (2) to which a generator axis of an energy harvester is coupled, the rotation axis of the generator being coincident with the central axis (11). Upon full pressure/release, the element (3) is forced to rotate around the pivot point (14), allowing a vertically raised pin (22) of the second member (2) to disengage a recessed area (31, 32) at each end of a slot (30) of the element (3) and the second member (2) to rotate to its rest position.

9 Claims, 4 Drawing Sheets

ENERGY HARVESTING DEVICE

CROSS-REFERENCE TO PRIOR APPLICATIONS

This application is the U.S. National Phase application under 35 U.S.C. §371 of International Application No. PCT/0312/057357, filed on Dec. 14, 2012, which claims the benefit of [e.g., U.S. Provisional Patent Application No. or European Patent Application No.] 61/576,396, filed on Dec. 16, 2011. These applications are hereby incorporated by reference herein.

FIELD OF THE INVENTION

The invention relates to the field of wireless batteryless energy-harvesting devices such as light switches, sensor devices, and controller devices, and more particularly to an electromechanical-energy harvesting toggle switch.

BACKGROUND OF THE INVENTION

Wireless technologies present major advantages in terms of freedom of device placement, portability/mobility, and installation cost reduction, since there is no need for drawing cables and drilling. Thereby, such technologies are particularly attractive for interconnecting, detecting, automation, control or monitoring systems using sensor devices such as light devices, light dimmers, wireless remote controllers, and movement or light detectors, that have to be set up in distant places one from the other and from the devices they control. For example, lighting controls may include rotary/dial dimmer switches, slide dimmer switches, touch pad dimmers or plug-in dimmer switches. The rotary/dial dimmer switches have a knob that can be adjusted from full light to very dim and all brightness measures in between, while the on/off function can be integrated in the knob or processed by a separate button. The slide dimmer switches have a sliding handle that allows adjusting the amount of light and brightness, while the on/off function can be integrated in the handle or processed by a separate button. The touch pad dimmers have light and brightness adjusted by moving his finger on the pad. The plug-in dimmer switches are to be plugged into an outlet, while a lamp is to be plugged into the switch. Light and brightness are controlled through a dial on the plug-in dimmer switch.

One of the drawbacks appearing in networks of the like relates to device powering. Indeed, since the devices are not wired, they cannot anymore receive power necessary for performing all the operations required in the network from the mains or via the connection with the controller. Thus, it has been envisaged to equip such devices with built-in batteries. However, since the devices are quite size-constrained, batteries may not be of a large size, thereby resulting in a reduced device lifetime and then in labour intensive battery replacement, which may be time-consuming.

This issue can be solved by providing self-powered devices, which harvest the energy required for operation and communication from their surroundings such as light, temperature, movement (e.g. rotation, vibration, flow), and electro-magnetic radiation, or from the interaction with the human user.

For example, an electro-dynamic power generator such as ECO 100 can be used to power a dedicated radio transmitter module PTM 200 from EnOcean. Such a generator acts like a common electro-dynamic energy transducer, wherein a magnetic element moves in an energy-harvesting coil after actuation by a spring that can be pushed from outside the device by an appropriate push-button or switch rocker. When the spring is pushed up or down, the generated electrical energy is supplied to the module PTM 200, and a RF telegram including a 32-bit module ID and the polarity of the supply voltage can then be transmitted via the module PTM 200. However, this illustrative solution is optimized for working jointly with the proprietary control technology, which makes the system architecture more complex to design and more costly when choosing to operate with other control technologies. Indeed, gateways are then required for translating from the proprietary control technology into a standard control technology compliant for example with IEEE 802.15.4 and ZigBee standards-based protocols. In addition, the amount of harvested energy is proportional to the speed of change of the magnetic field, which, in turn, is determined by the speed of movement of some parts of mechanics/harvester. The speed of the user action (pressing/releasing/holding) the button is usually not sufficient and not predictable. The focus on optimizing the technical aspects of the design such as mechanics, power harvesting, conversion and storage, and integration with the load (radio), in order to match the amount of energy harvestable from the user action, may lead to sacrifice the usability aspects such as the functionality offered to the user, intuitiveness of controls and ease-of-use of controls (e.g. number and order of steps required as compared with the mains- or battery-powered devices).

SUMMARY OF THE INVENTION

It is an object of the invention to provide a very simple and robust wireless batteryless energy-harvesting device capable of harvesting sufficient energy by fully pushing and releasing a switch button.

This object is achieved by a wireless batteryless energy-harvesting device as claimed in claim 1.

Accordingly, a harvesting mechanism is provided, which is simple, robust and does allow for harvesting the energy on pushing and releasing the button. The proposed harvesting device or harvester is very simple, very robust, and the energy is harvested only at the end of particular action, i.e. when the button is fully pressed/released (i.e. is not influenced in any way by the speed of action).

According to a first aspect, the wireless batteryless energy-harvesting device comprises:
  a first member adapted to rotate around its central axis;
  a second member adapted to rotate around the central axis of the first member from a first end of the second member;
  an element having a slot formed through the element and a laterally raised portion, each end of the slot including a first and second recessed area, respectively;
  a first spring coupled to a portion of a first end of the first member;
  a second spring coupled to a portion of the first end of the second member;
  a first stop;
  a second stop facing the first stop;
  a third stop; and
  a fourth stop facing the third stop,
wherein:
  a second end of the second member has a vertically raised pin;
  a generator axis of an energy harvester is coupled to the second member such that the rotation axis of the generator is coincident with the central axis;
  the vertically raised pin is adapted to engage the slot of the element;

the element is loosely fixed at a portion of a second end of the first member; and the third and fourth stops limit an angular movement of the first member.

According to a second aspect which can be combined with the first aspect, the wireless batteryless energy-harvesting device comprises a button whose pressure and/or release after pressure induces the angular movement of the first end of the first member, thereby actuating the harvesting mechanism.

According to a third aspect which can be combined with the second aspect, upon pressure of the button, this angular movement is in a direction for which the first spring elastically deforms, said deformation of the first spring thereby storing the pressure energy.

According to a fourth aspect which can be combined with the second aspect, upon release of the button, this angular movement is in a direction for which the second spring elastically deforms, said deformation of the second spring thereby storing the release energy.

According to a fifth aspect which can be combined with the second aspect, upon pressure of the button, the rotation of the second member around the central axis of the first member in the same direction as the movement direction of the element is induced by the vertically raised pin of the second member when engaging the first recessed area. Thereby, the generator axis of the energy harvester can move and the second spring attached to the second member can further store energy.

According to a sixth aspect which can be combined with the fifth aspect, the laterally raised portion of the element leans against the first stop when the button is nearly fully pressed. Thereby, the element is ready to be forced to rotate upon full pressure.

According to a seventh aspect which can be combined with the fifth or sixth aspect, upon full pressure of the button, the element is forced to rotate around the portion of the second end of the first member at which the element is fixed on a pivot point, in such a manner that the vertically raised pin can disengage the first recessed area for then engaging the second recessed area. Thereby, the second member can rotate to its rest position, and sufficient energy can be harvested upon full pressure independently on the speed of the pressure action.

According to a eighth aspect which can be combined with the second aspect, upon release of the button, the rotation of the second member around the central axis of the first member in the same direction as the movement direction of the element is induced by the vertically raised pin of the second member when engaging the second recessed area. Thereby, the generator axis of the energy harvester can move and the second spring attached to the second member can further store energy.

According to a ninth aspect which can be combined with the eighth aspect, the laterally raised portion of the element leans against the second stop when the button is nearly fully released. Thereby, the element is ready to be forced to rotate upon full release.

According to a tenth aspect which can be combined with the eighth or ninth aspect, upon full release of the button, the element is forced to rotate around the portion of the second end of the first member at which the element is fixed on a pivot point, in such a manner that the vertically raised pin can disengage the second recessed area for then engaging the first recessed area. Thereby, the second member can rotate to its rest position, and sufficient energy can be harvested upon full release independently on the speed of the release action.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Figure 1:
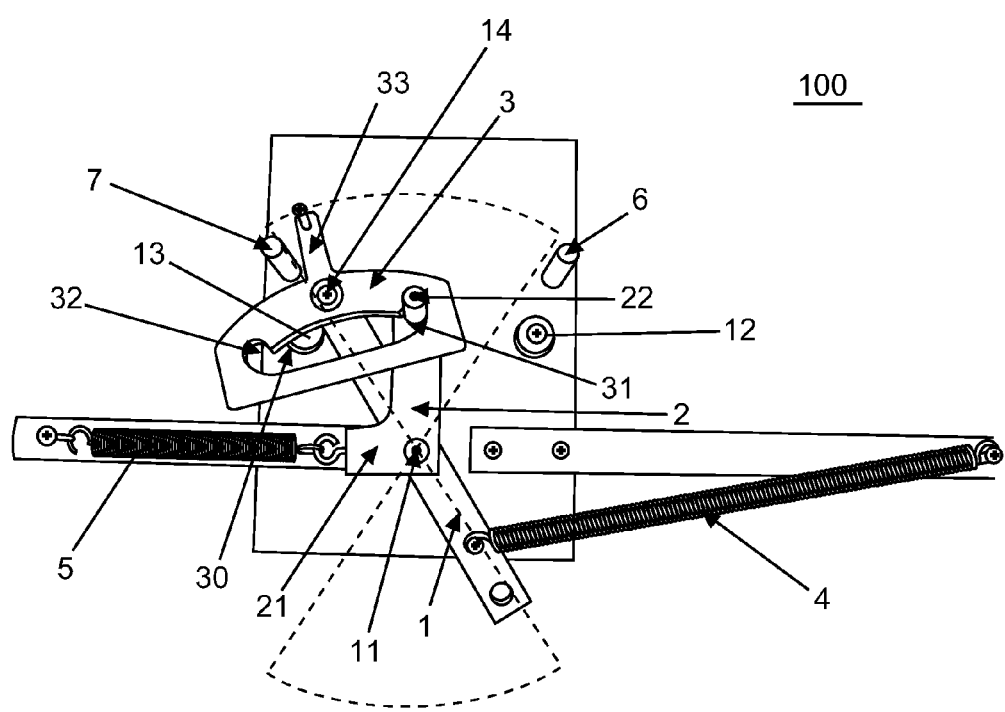
FIG. 1 shows a complete view of a device at rest position according to the invention, wherein the area swept by the first member during the harvesting mechanism at press and release of the button is depicted as a dashed-line.

The present invention relates to a wireless batteryless energy-harvesting device 100 as shown in FIG. 1. The device 100 comprises a first member 1, a second member 2 with a vertically raised pin 22, an element 3 with a slot 30 formed therethrough and a laterally raised portion 33 extending outward from the element 3, a first spring 4 coupled to a portion of a first end of the first member 1, a second spring 5 coupled to a portion of a first end 21 of the second member 2, a first and second stop 6, 7 facing each other, and a third and fourth stop 12, 13 facing each other.

The first member 1 is adapted to rotate around its central axis 11. The second member 2 is mounted above the first member 1 and is adapted to rotate around the central axis 11 of the first member 1 from its first end. To the second member 2 is coupled a generator axis of an energy-harvester, e.g., a magnet moving with respect to a coil in order to generate a voltage pulse in the energy harvesting coil or a step motor, such that the rotation axis of the generator is coincident with the central axis 11. The vertically raised pin 22 engages the slot 30, 31, 32 of the element 3, each end of the slot 30 including a respective first and second recessed area 31, 32. The element 3 that is mounted above the second member 2 is loosely fixed at a portion of a second end of the first member 1 on a pivot point 14 (e.g., a combination of a bolt and flat washer), which allows a forced rotation of the element 3 around that portion on the pivot point 14.

The harvesting mechanism cycle of the device 100 according to the invention will now be described in connection with FIG. 2. Starting from a rest position (step a), the linear movement of a button or a switch handle, induced by a user pressing it, is translated into an angular movement (cf. the dashed-lines in FIG. 1) of the first end of the first member 1 in a rotation direction (e.g., clockwise) for which the swept area of the first end of the first member 1 increases and in which the first spring 4 starts elastically to deform. Thus, the first member 1 rotates around its central axis 11 in the same rotation direction as that of the first end of the first member 1, thereby moving the element 3 that is loosely fixed at the second end of the first member 1 in the same rotation direction as that of the first end of the first member 1. The vertically raised pin 22 of the second member 2, which engages the first recessed area 31 at an end of the slot 30, induces the rotation of the second member 2 around the central axis 11 of the first member 1 in the same direction as the movement direction of the element 3, which results in an elastic deformation of the second spring 5. The angular movement of the first member 1 is limited by the third stop 12. The laterally raised portion 33 of the element 3 leans against the first stop 6 when the button is nearly fully pressed, e.g., pressed at 90%. Thereby, the user can intuitively percieve that the button is nearly fully pressed (step b). Then, by fully pressing the button, i.e., at 100%, the first member 1 leans against the third stop 12 and the element 3, whose laterally raised portion 33 leans against the first stop 6, is forced to rotate around the portion of the second end of the first member 1 at which the element 3 is fixed on the pivot point 14, in such a manner that the vertically raised pin 22 can disengage the first recessed area 31 (step c). Afterwards, the force exerted by the second spring 5 for returning to its rest position leads the vertically raised pin 22 to slide along the slot 30 (step d) and to finally engage the second recessed area 32 (step e). Finally, the second spring 5, the second member 2 and by the way the vertically raised pin 22 return to their initial or rest position. Thus, the energy is harvested when the button is fully pressed and the second member 2 has rotated to its rest position.

Upon release of the pressed button, the force exerted by the first spring 4 for returning to its rest position leads the first end of the first member 1 to move in a reverse rotation direction (e.g., anti-clockwise) with respect to the rotation direction upon pressure. Thus, the first member 1 rotates around its central axis 11 in that reverse rotation direction, thereby moving the element 3 that is loosely fixed at the second end of the first member 1 in the same rotation direction as that of the first end of the first member 1. The vertically raised pin 22 of the second member 2, which engages the second recessed area 32 at an end of the slot 30, induces the rotation of the second member 2 around the central axis 11 of the first member 1 in the same direction as the movement direction of the element 3, which results in an elastic deformation of the second spring 5 (step f). The angular movement of the first member 1 is limited by the fourth stop 13. The laterally raised portion 33 of the element 3 leans against the second stop 7 when the button is nearly fully released, e.g., at 90%. Then, upon full release of the button, i.e., at 100%, the element 3, whose laterally raised portion 33 leans against the second stop 7, is forced by the second spring 5 to rotate around the portion of the second end of the first member 1 at which the element 3 is fixed on the pivot point 14, in such a manner that the vertically raised pin 22 can disengage the second recessed area 32 (step g). Afterwards, the force exerted by the second spring 5 for returning to its rest position leads the vertically raised pin 22 to slide along the slot 30 (step h) and to finally engage the first recessed area 31 (step i). Finally, the device 100 returns its rest position; in particular, the first and second springs 4, 5, the second member 2 and by the way the vertically raised pin 22 return to their rest position (step i). Thus, the energy is harvested when the button is fully released and the second member 2 has rotated to its rest position.

Figure 3A:
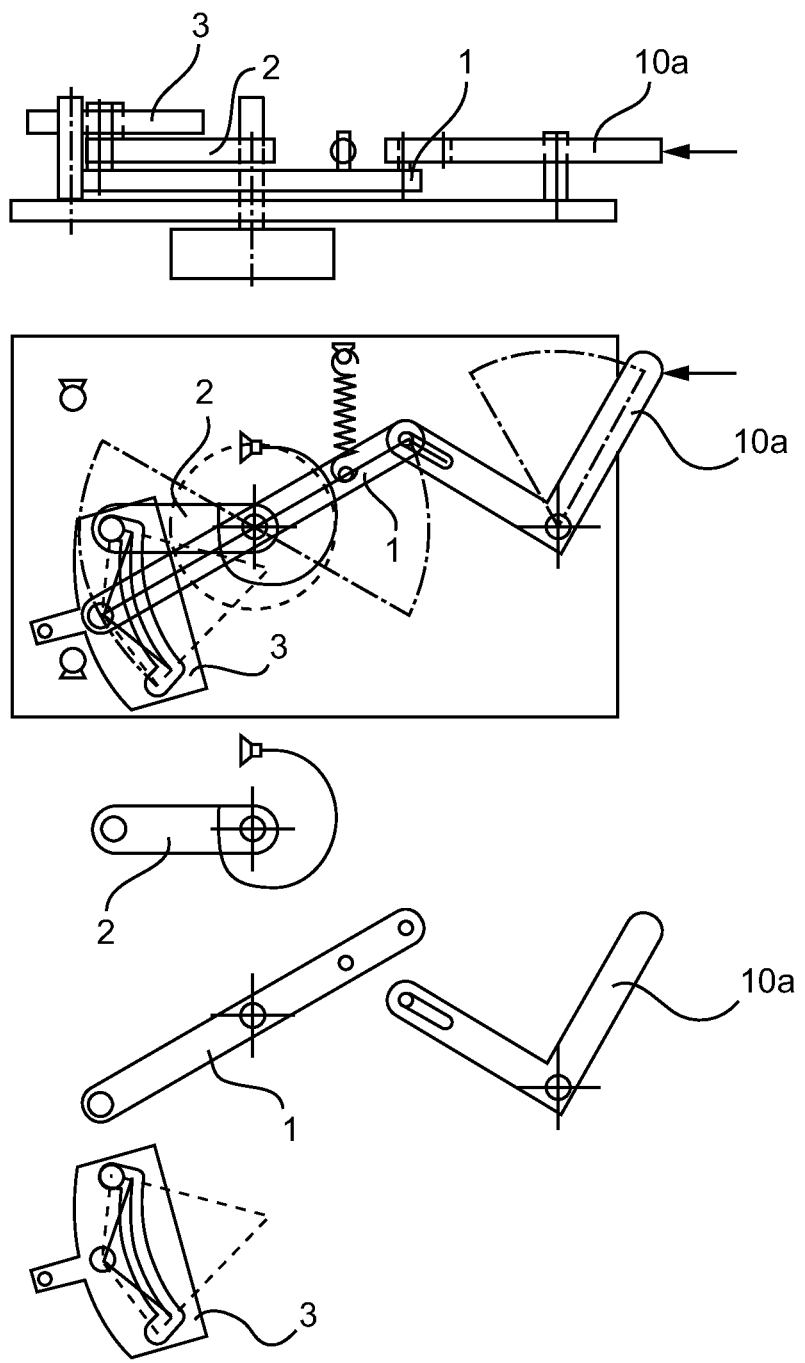
FIGS. 3a and 3b show schematic views of the actuation (as illustrated by an arrow) of the device according to the invention in the plane of the harvesting mechanism (FIG. 3a) and perpendicular to the plane of the harvesting mechanism (FIG. 3b).
Figure 3B:
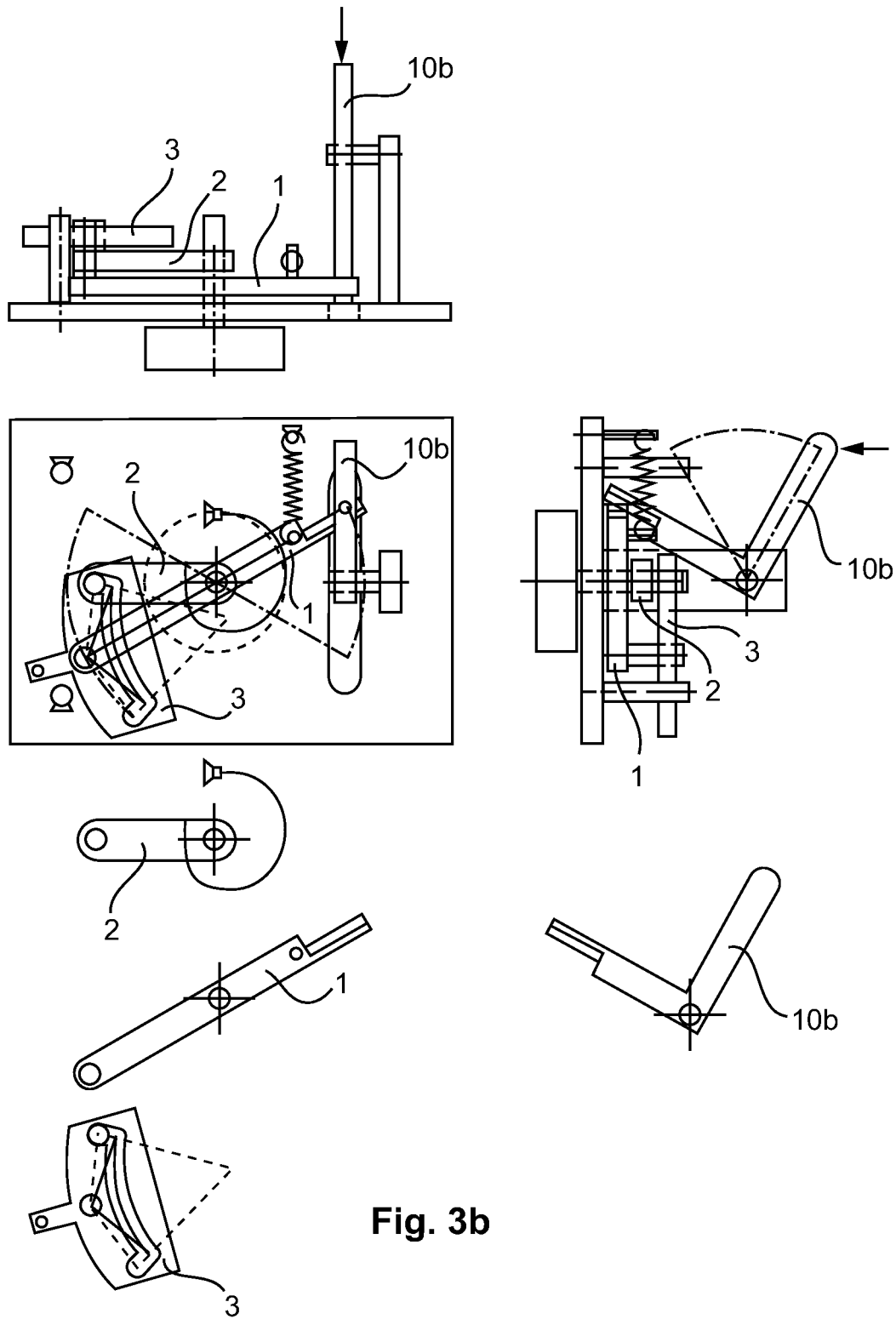

FIGS. 3a and 3b depict possible ways of actuating the device 100 according to the invention by an interfacing member 10a, 10b, as indicated by the arrows, either in the plane of the harvesting mechanism (FIG. 3a, interfacing member 10a) or perpendicular to the plane of the harvesting mechanism (FIG. 3b, interfacing member 10b). Additionally, the angular movement of the first member 1, the second member 2, the element 3 and the member 10a, 10b interfacing the button (not shown) and the first member 1 and an exploded view of these parts, is represented for illustration.

Figure 2:
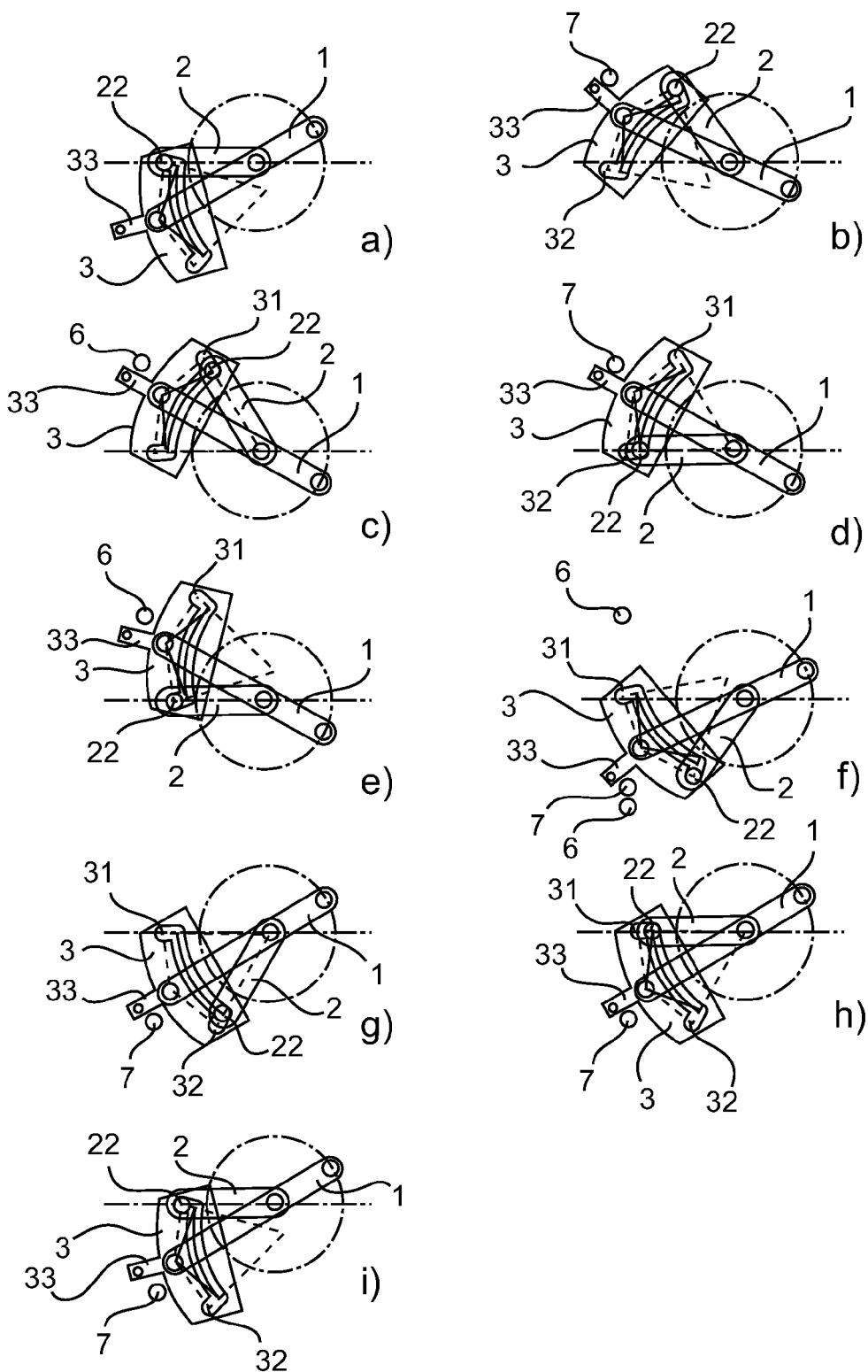
FIG. 2 shows a schematic view of the harvesting mechanism cycle of the device according to the invention, the cycle being split into a sequence of steps a to i.

It is noted that the order of mounting of the first member 1, the second member 2 and the element 3, as aforementioned in conjunction with FIGS. 1-3 is for illustrative purpose only. Other orders of mounting/stacking up in vertical direction are possible for the first member 1, the second member 2 and the element 3.

It is noted that, in the harvesting mechanism of the invention, the amount of harvested energy upon full pressure or release of the switch handle or button, is independent on the speed of action, unlikely to typical energy harvesters in the form of a magnet.

It is furthermore noted that the invention can be applied to any electromechanical energy-harvesting toggle switches in order to allow for additional control features for the user such as both ON/OFF and dimming, which can be realized in an intuitive, convenient, and reliable way.

In summary, a very simple and robust wireless batteryless device 100 for harvesting energy has been described. The actuation upon button pressure/release results in a rotation of a first member 1 around its central axis 11 leading to a move of an element 3, which is loosely fixed at the first member 1 from a pivot point 14, and a rotation around the central axis 11 of the second member 2 to which a generator axis of an energy harvester is coupled, the rotation axis of the generator being coincident with the central axis 11. Upon full pressure/release, the element 3 is forced to rotate around the pivot point 14, allowing a vertically raised pin 22 of the second member 2 to disengage a recessed area 31, 32 at each end of a slot 30 of the element 3 and the second member 2 to rotate to its rest position.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A wireless energy-harvesting device comprising:
   a first member adapted to rotate around a central axis;
   a second member, mounted above the first member, and adapted to rotate around the central axis of the first member from a first end of the second member;
   an element, being loosely fixed at a portion of a second end of the first member at a pivot point, and having a slot formed through the element and a laterally raised portion, each end of the slot including a first and second recessed area, respectively;
   a first spring coupled to a portion of a first end of the first member;
   a second spring coupled to a portion of the first end of the second member;
   a first stop and a second stop facing the first stop, the first stop arranged to allow for the laterally raised portion of the element to rest against itself;
   a third stop and a fourth stop facing the third stop, arranged in a configuration to limit an angular motion of the first member and;
   a button, wherein the angular movement of the first end of the first member is induced by a pressure of the button and/or a release of the pressed button;
   wherein:
   a second end of the second member has a vertically raised pin;
   a generator axis of an energy harvester is coupled to the second member such that the rotation axis of the generator is coincident with the central axis;

the vertically raised pin is adapted to engage the slot of the element.

2. The wireless energy-harvesting device according to claim 1, wherein the angular movement of the first end of the first member upon pressure of the button is in a direction for which the first spring starts elastically to deform.

3. The wireless energy-harvesting device according to claim 1, wherein the angular movement of the first end of the first member upon release of the button is in a direction for which the second spring starts elastically to deform.

4. The wireless energy-harvesting device according to claim 1, wherein the rotation of the second member around the central axis of the first member in the same direction as the movement direction of the element is induced by the vertically raised pin of the second member when engaging the first recessed area, upon pressure of the button.

5. The wireless energy-harvesting device according to claim 4, wherein the laterally raised portion of the element leans against the first stop when the button is nearly fully pressed.

6. The wireless energy-harvesting device according to claim 4, wherein, upon full pressure of the button, the element is forced to rotate around the portion of the second end of the first member at which the element is fixed on a pivot point, in such a manner that the vertically raised pin can disengage the first recessed area for then engaging the second recessed area.

7. The wireless energy-harvesting device according to claim 1, wherein the rotation of the second member around the central axis of the first member in the same direction as the movement direction of the element is induced by the vertically raised pin of the second member when engaging the second recessed area, upon release of the button.

8. The wireless energy-harvesting device according to claim 7, wherein the laterally raised portion of the element leans against the second stop when the button is nearly fully released.

9. The wireless energy-harvesting device according to claim 7, wherein, upon full release of the button, the element is forced to rotate around the portion of the second end of the first member at which the element is fixed on a pivot point, in such a manner that the vertically raised pin can disengage the second recessed area for then engaging the first recessed area.

* * * * *